United States Patent [19]

Hiesinger

[11] Patent Number: 4,746,944
[45] Date of Patent: May 24, 1988

[54] HANDGRIP FOR ATTACHMENT TO OPTICAL PHOTOGRAPHIC EQUIPMENT

[75] Inventor: Reinhard Hiesinger, Ottobeuren, Fed. Rep. of Germany

[73] Assignee: Firma Novoflex Fotogeratebau Karl Miller, Memmingen, Fed. Rep. of Germany

[21] Appl. No.: 885,652

[22] Filed: Jul. 15, 1986

[30] Foreign Application Priority Data

Jul. 31, 1985 [DE] Fed. Rep. of Germany ....... 3527368

[51] Int. Cl.⁴ ...................... G03B 29/00; G03B 17/56
[52] U.S. Cl. ....................................... 354/82; 352/243; 354/293
[58] Field of Search ................... 354/288, 81, 82, 293; 352/243

[56] References Cited

U.S. PATENT DOCUMENTS

| 3,043,205 | 7/1962 | Kaminski | 352/243 |
| 4,083,480 | 4/1978 | Lee et al. | 354/293 X |
| 4,221,477 | 9/1980 | Prochnow et al. | 354/82 |

FOREIGN PATENT DOCUMENTS

| 1194697 | 6/1965 | Fed. Rep. of Germany | 354/293 |
| 912577 | 12/1962 | United Kingdom | 354/293 |

Primary Examiner—Donald A. Griffin
Attorney, Agent, or Firm—Holman & Stern

[57] ABSTRACT

A handgrip for attachment to optical photographic equipment comprises a handle (2) and a mounting (1), which can be swivelled relative to each other. The mounting (1) is connected to the equipment, whilst the trigger mechanism (6, 3) for mechanical or electrical operation is located in the handle (2).

20 Claims, 3 Drawing Sheets

HANDGRIP FOR ATTACHMENT TO OPTICAL PHOTOGRAPHIC EQUIPMENT

BACKGROUND OF THE INVENTION

1. Field of the Invention

The invention relates to a hand grip for attachment to photographic equipment, comprising a handle and mounting for attachment to the equipment.

2. Description of the Prior Art

When filming and photographing using photographic cameras and also using video equipment, the problem frequently arises that the equipment is required on one hand to be firmly and securely held and, on the other hand the trigger must be capable of being operated without difficulty in each position. This is particularly difficult when the equipment is rotated about the optical axis. On traditional photographic cameras, film cameras and video cameras the trigger is frequently located on the front or top of the camera, whereas the camera is held on the side and from below. This arrangement is unsatisfactory and requires a lengthy search for the trigger in which it is also frequently necessary to put down the camera.

This is particularly awkward when filming or taking snapshots.

A further problem presents itself when changing from portrait to landscape format using photographic cameras and bellows units. Particularly when using bellows units and heavy lenses, such as telescopic lenses, maintaining the camera in a fixed position when changing over between portrait and landscape formats is only possible with great difficulty.

SUMMARY OF THE INVENTION

The object of the invention, therefore, is to provide a handgrip which enables the camera to be securely fixed and the trigger to be operated with ease.

To this end, the invention provides a handgrip for attachment to optical photographic equipment and comprises a handle and mounting for attachment to the equipment, with the mounting swivel-mounted on the handle and capable of being locked in several positions.

The handle, which can be protected against slipping by fitting with an appropriate covering, is secured to the optical photographic equipment from below by means of the mounting. The swivel mechanism can be released and locked by operation of a push button. Several swivel positions up to 90 deg can be provided. This means that the camera can be firmly held in each desired format by means of a secure handgrip.

In a further modification, the handle may be fitted with a trigger which can be connected to the camera equipment and is intended for either mechanical or electrical operation of the equipment. The location in the handle ensures that the trigger can be operated with equal ease in every position of the equipment.

The handle may also be equipped with a socket for a cable release and a socket for connection of an electrical cable so that every type of equipment can be connected to the trigger in the handle.

For the electrical operation there is also a suitable switch fitted in the handle.

It is particularly advantageous if the trigger can be locked in two positions, for mechanical and electrical operation. This simplifies the construction and operation. Mistakes in operation when using different types of equipment are obviated.

It is advantageous if the trigger has a longer operational travel in the mechanical setting than in the electrical setting. For the electrical triggering a very short travel is sufficient to close the contacts in the switch, whereas for mechanical operation a longer travel is necessary. Depending upon the type of operation required the trigger can be very quickly changed over from the electrical to the mechanical setting. All that is required is a simple rotation using a coin.

In one embodiment of the invention the handle is attached to the equipment by a threaded pin rotated by an operating wheel. The surface of the mounting which engages with the equipment is provided with a slip-proof, soft cover to which the equipment can be secured without damage. The threaded pin, which is rotated by the operating wheel, enables the mounting to be easily connected and disconnected from the camera. The threaded pin has the same thread as is normal on a tripod, thus enabling the handgrip to be screwed into the tripod socket. It is advantageous for the base of the handle to have a threaded socket. This threaded socket also has the same dimensions as the threads on tripods which means that when the camera is attached to the handgrip it can also be mounted on a tripod.

BRIEF DESCRIPTION OF THE DRAWINGS

The invention will now be described in detail with reference to the accompanying drawings showing an example of one type of handgrip according to the invention wherein.

DETAILED DESCRIPTION OF THE PREFERRED EMBODIMENT

Figures 1, 2, 5:
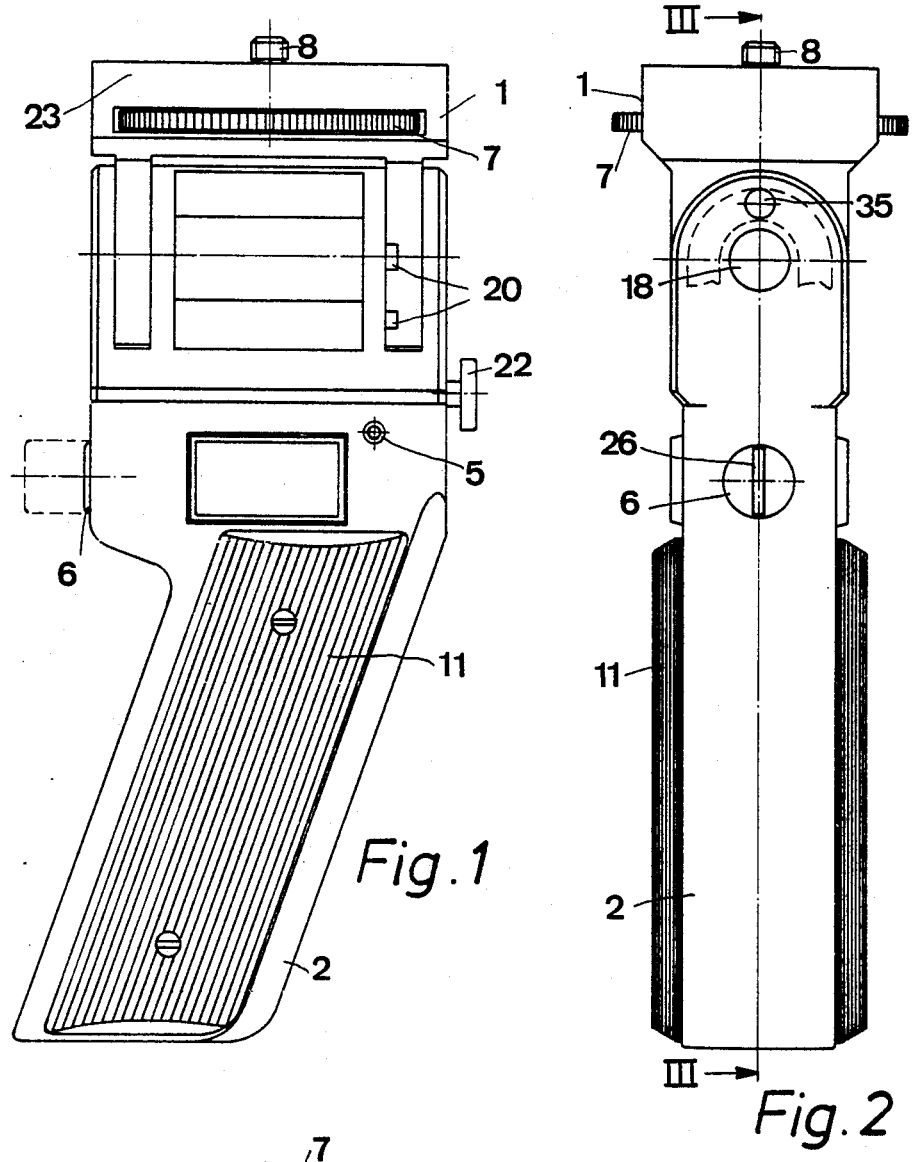
FIG. 1 is a side elevational view of a handgrip according to the invention.
FIG. 2 is a left end elevational view of the handgrip in accordance with FIG. 1.
FIG. 5 is a top plan view of FIG. 1.

The handgrip comprises a mounting 1 and handle 2. The handle 2 can be easily angled and has grip plates 11 screwed to the sides. The plates 11 are profiled to provide a good handhold.

The base 9 of the handle 2 has a threaded socket 10 the thread of which is the same as that of a normal tripod. This means that the handgrip can be mounted on a tripod.

The trigger mechanism 13 is located in the upper section 12 of the handle 2. The trigger mechanism 13 comprises a switch 3, a trigger 6, and a socket 4 for the cable release and a socket 5 for an electrical connecting cable.

Figure 3:
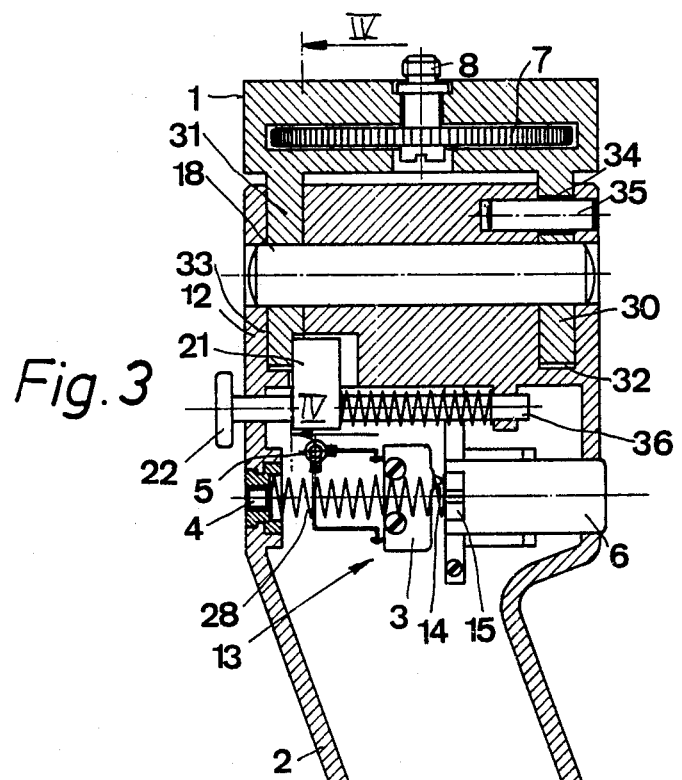
FIG. 3 is a cross-sectional view of the handgrip taken along line III—III of FIG. 2.

FIG. 3 shows the setting for operation using the electrical switch 3. In this setting, the trigger 6 is almost retracted inside the handle 2. The switch is made by lightly pressing the trigger 6 inwards thus actuating the switch by means of plunger 14 and transmitting the signal via the electrical cable to socket 5.

Figure 6:
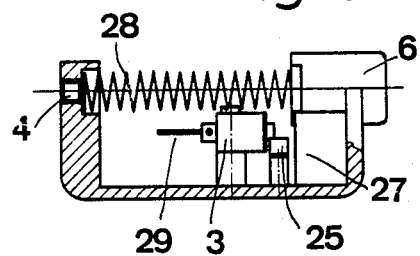
FIG. 6 is a cross sectional detail of the invention.
Figure 8:
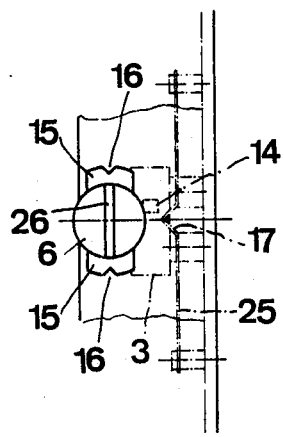
FIG. 8 is a fragmented front view of FIG. 7.
Figure 7:
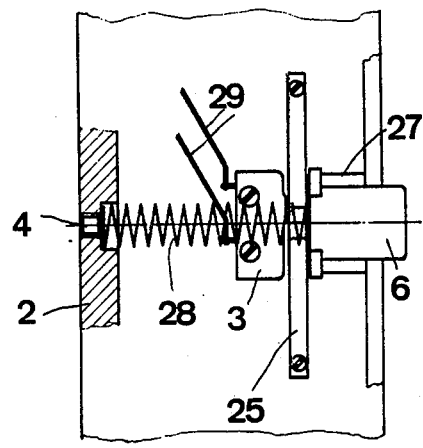
FIG. 7 is a top plan view of FIG. 6.

FIGS. 6 to 8 show the setting of trigger 6 for mechanical operation. In this position, a cable release in socket 4 is actuated with the aid of trigger 6. The trigger 6 has a relatively long travel in this position.

The other positions of trigger 6 for electrical operation are set by cams 15 which have notches 16. For this purpose, a V-shaped tab 17 of a retaining spring 25 engages in the notches 16 when trigger 6 is rotated 90 degrees relative to the position shown in FIGS. 6 to 8.

The trigger 6 can be rotated by inserting a coin, or something similar, into the slot 26. This rotation is, however, only possible when the trigger 6 is partially depressed so that the cams 15 are released from guide blocks 27. These guide blocks guide the cams 15 of trigger 6 during mechanical operations and, during electrical operation, limit the return travel of trigger 6 under the influence of return spring 28.

The particular cam 15 whose notch engages with the tab 17 actuates plunger 14 of switch 3. The cable 29 connects the switch 3 with the socket 5.

Figure 4:
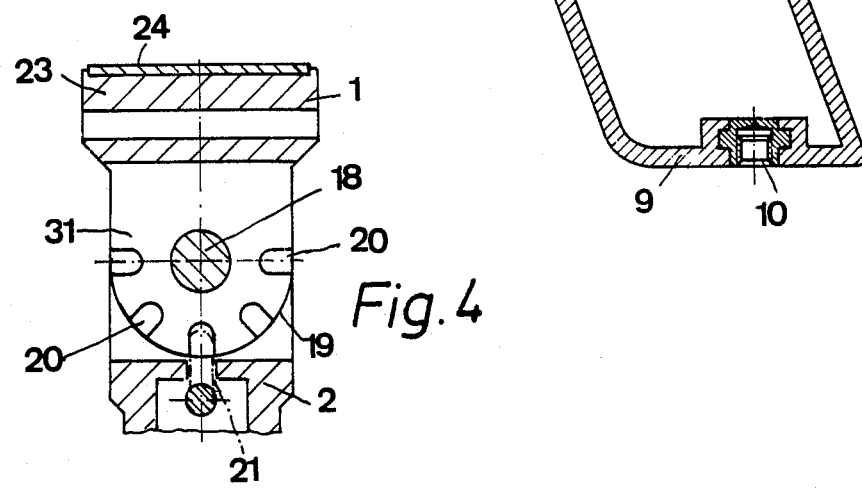
FIG. 4 is a cross-sectional view of a part of the handgrip taken on line IV—IV in FIG. 3.

The swivel joint between the mounting 1 and the handle 2 is shown in more detail in FIG. 4. A pin 18 connects the two parts together. Two rounded lugs 30, 31 of mounting 1 fit into matching slots 32, 33 of the handle 2. Lug 31 has recesses 20 in its lower round section 19 in which projection 21 engages. The projection 21 is seated on pushrod 36 and is operated by push button 22. The recesses 20 are arranged to provide several swivel angles, preferably 90 degrees and 45 degrees, of the mounting 1 relative to the handle 2.

Lug 30 is provided with a semi-circular cut-out 34 in which pin 35 engages. The pin 35 abuts the ends of the cut-out 34 to limit the rotational movement of mounting 1 relative to handle 2.

The upper section of the mounting consists of a plate 23 which carries a soft slip-proof cover 24 (FIG. 4). The cover 24 comes into direct contact with the optical phtographic equipment which is secured to the mounting by the threaded pin 8 using the operating wheel 7.

The optical photographic equipment is not illustrated in any detail. It can, for instance, be a film camera, a bellows unit, a video unit or something similar. The alignment of the optical axis of the equipment is preferably to be parallel to the axis of pin 18.

I claim:

1. A handgrip for attachment to optical photographic equipment comprising:
a handle;
a mounting member;
an operating wheel movably mounted on said mounting member;
a threaded pin connected to said operating wheel for releasably connecting the handgrip to the equipment;
a trigger mounted on said handle;
operating means for operating the equipment in response to operation of said trigger;
lug means projecting from said mounting member;
pivot pin means on said handle pivotally connecting said lug means to said handle so that said mounting member is rotatable about the pivot pin axis relative to said handle; and
interengageable locking means on said handle and mounting member for releasably locking said mounting member in a selected position of rotation relative to said handle.

2. A handgrip as claimed in claim 1 wherein:
at least one slot is provided in said handle;
said lug means comprises at least one lug member projecting from said mounting member and engaging in said at least one slot;
aligned holes are provided in said at least one lug member and said handle; and
said pivot pin means comprises a pivot pin in said aligned holes.

3. A handgrip as claimed in claim 2 wherein:
said at least one slot comprises two spaced substantially parallel slots;
said at least one lug member comprises two spaced substantially parallel extending lug members engaged in said slots;
said aligned holes are provided in said handle and both lug members; and
said pivot pin engages in both aligned holes in said lug members.

4. A handgrip as claimed in claim 3 wherein said locking means comprises:
a plurality of circumferentially spaced locking recesses in one of said lug members;
a pushrod axially slidably supported in said handle;
a locking projection recess in said handle;
a locking projection on said pushrod for movement therewith and extending into and movable in said recess for engaging in and disengaging from said locking recesses by axial sliding movement of said pushrod.

5. A handgrip as claimed in claim 4 wherein said locking means further comprises:
resilient means between said handle and said pushrod for resiliently urging said pushrod in the direction of engagement of said locking projection in said locking recesses.

6. A handgrip as claimed in claim 5 wherein:
said handle has an outer front face;
said pushrod extends through a hole in said front face;
said locking recesses are on a side of said one lug member facing in a direction opposite to that of said front face; and
said pushrod disengages said locking projection from said locking recesses by axial movement inwardly relative to said handle.

7. A handgrip as claimed in claim 6 and further comprising:
an arcuate slot in one of said lug members extending partly around and coaxially with said pivot pin;
a step pin mounted in said handle and extending at least partly in said arcuate slot; and
ends on said arcuate slot engageable with said stop pin for limiting rotation of said mounting member relative to said handle.

8. A handgrip as claimed in claim 6 wherein said operating means comprises:
electrical switch means mounted on said handle; and
electrical connecting means for removably connecting said switch means with said equipment.

9. A handgrip as claimed in claim 8 wherein said electrical connecting means comprises:
electrical socket means mounted on said handle for removable connection with an electrical cable of the equipment and electrically connected to said switch means.

10. A handgrip as claimed in claim 9 wherein:
said trigger is movably mounted for longer operating travel in a mechanical operating position than in an electrical operating position.

11. A handgrip as claimed in claim 6 wherein said operating means comprises:

a cable release socket means for receiving in connecting engagement a cable release device in a position to be actuated by operation of said trigger.

12. A handgrip as claimed in claim 2 wherein said locking means comprises:

a plurality of circumferentially spaced locking recesses in said at least one lug member;

a pushrod axially slidably supported in said handle;

a locking projection recess in said handle;

a locking projection on said pushrod for movement therewith and extending into and movable in said recess for engaging in and disengaging from said locking recesses by axial sliding movement of said pushrod.

13. A handgrip as claimed in claim 2 wherein said locking means further comprises:

resilient means between said handle and said pushrod for resiliently urging said pushrod in the direction of engagement of said locking projection in said locking recesses.

14. A handgrip as claimed in claim 13 wherein:

said handle has an outer front face;

said pushrod extends through a hole in said front face;

said locking recesses are on a side of said at least one lug member facing in a direction opposite to that of said front face; and said pushrod disengages said locking projection from said locking recesses by axial movement inwardly relative to said handle.

15. A handgrip as claimed in claim 1 wherein said operating means comprises:

electrical switch means mounted on said handle; and electrical connecting means for removably connecting said switch means with said equipment.

16. A handgrip as claimed in claim 15 wherein said electrical connecting means comprises:

electrical socket means mounted on said handle for removable connection with an electrical cable of the equipment and electrically connected to said switch means.

17. A handgrip as claimed in claim 1 wherein said operating means comprises:

a cable release socket means for receiving in connecting engagement a cable release device in a position to be actuated by operation of said trigger.

18. A handgrip as claimed in claim 1 wherein:

said trigger is mounted for operating in one of two positions for mechanical and electrical operation.

19. A handgrip as claimed in claim 18 wherein:

said trigger is movably mounted for longer operating travel in said mechanical operating position than in said electrical operating position.

20. A handgrip as claimed in claim 19 and further comprising:

a base on said handle; and a threaded socket in said base.

* * * * *